United States Patent [19]
Moran

[11] 3,758,031
[45] Sept. 11, 1973

[54] HEATER FOR AUTOMOTIVE VEHICLES

[76] Inventor: John P. Moran, 70 E. Main St., Hopkinton, Mass.

[22] Filed: May 8, 1972

[21] Appl. No.: 251,346

[52] U.S. Cl............ 237/8 A, 237/12.3 C, 123/142.5
[51] Int. Cl............................ F24d 3/02, B60h 1/22
[58] Field of Search...................... 237/12.3 C, 8 A, 237/36; 123/142.5

[56]  References Cited
UNITED STATES PATENTS
3,236,453    2/1966    Raymond...................... 237/12.3 C
3,362,638    1/1968    Hertlein et al................ 237/12.3 C Primary Examiner—William E. Wayner
Attorney—Melvin R. Jenney, Henry D. Pahl, Jr. et al.

[57]  ABSTRACT

The heat-generating system disclosed herein is adapted to burn diesel fuel and to otherwise effectively utilize available automotive electrical and pneumatic systems, e.g., such as those normally found on semi-trailer tractor trucks, and to thereby efficiently provide heat for maintaining an automotive engine at an easily started temperature and to provide heat for an operator, if needed, while the engine is stopped.

5 Claims, 6 Drawing Figures

PATENTED SEP 11 1973

TO TRUCK FUEL TANK

HEATER FOR AUTOMOTIVE VEHICLES

BACKGROUND OF THE INVENTION

This invention relates to a heater for diesel powered automotive vehicles and more particularly to such a heater which is adapted to burn the same fuel as the vehicle engine.

Various problems are known to exist relating to the operation of long-distance, semi-trailer tractor trucks in extremely cold climatic conditions. For example, if the temperature of a diesel engine drops below 20°F., difficulty in starting will typically be encountered. Further, if the temperature drops below zero, a conventional diesel engine may be essentially impossible to start. Thus, it is not feasible to shut such engines off for any extended period when the ambient temperature is substantially below freezing.

In addition, it is customary for the drivers engaged in long-haul trucking operations to sleep in bunks built into the truck cabs during their required rest periods between driving stints. As the cab heater usually employed in such trucks derives its heat from the engine coolant system, it is typically necessary that the driver leave the truck engine running during his break periods. It is thus not unusual to see a highway truck stop at night with a substantial number of large trucks parked stationary, but with their engines running at idle.

Long periods of idling operation are undesirable from many points of view. Under idling conditions, the typical diesel engine is relatively inefficient, so that the amount of atmospheric pollution created is disproportionately large even in relation to the amount of fuel being burned. Further, there is a significant problem with so-called noise pollution, that is, the noise of the diesel engine at idle may be disturbing not only to persons in a large surrounding area but also to the truck driver himself who may have to sleep under conditions which are quite trying. In view of these ecological problems, legislation has been proposed which would forbid a truck to remain stationary with its engine idling for longer than a relatively short predetermined period, e.g., 20 minutes. Long periods of idling are also relatively harmful to the engine itself in that the wasted fuel oil may wash the cylinder walls of lubricating oil and thus cause the cylinder walls and piston rings to be scored.

While various automotive auxiliary heaters have been proposed from time to time, e.g., for rendering either diesel or gasoline engines easier to start, these prior art auxiliary heaters have not provided a satisfactory solution to the problems noted above. While the electrical heaters commonly used on domestic vehicles for facilitating starting may be suitable for use at a base of operations where auxiliary electrical power is readily available, such heaters are not suitable for long-haul truck operations where stopping points may have uncertain facilities for making electric power available.

Another type of heater which has been proposed for use in various environments uses liquified propane gas since this fuel can relatively easily be transported and regulated to provide heat. Bottled propane gas, however, is classified as a dangerous substance and its transportation is strictly regulated. For example, trucks or trailers carrying bottled propane gas are prohibited from most tunnels and from passing under buildings which utilize the air space over certain major highways. Thus, the carrying of bottled propane gas is an unacceptable source of auxiliary heat energy for long-haul trucking operations. The use of gasoline in a heater burner also presents a safety problem.

Among the several objects of the present invention may be noted the provision of an auxiliary heat-generating system for diesel powered automotive vehicles; the provision of such a heat-generating system which is compatible with conventional truck systems and equipment; the provision of such a heat-generating system which is safe in operation; the provision of such a heat-generating system which does not create significant atmospheric or noise pollution; the provision of such a heat-generating system which is adapted to maintain a diesel engine at temperatures facilitating easy starting; the provision of such a heat-generating system which is adapted to maintain a truck cab at comfortable habitation temperatures; the provision of such a system which is reliable and which is relatively simple and inexpensive. Other objects and features will be in part apparent and in part pointed out hereinafter.

SUMMARY OF THE INVENTION

Briefly, the heat-generating system of the present invention is adapted for use in an automotive vehicle of the type which is powered by a liquid-cooled diesel engine and which has a battery powered electrical system. A boiler is provided which is interconnected with the vehicle engine cooling system through means which include a circulating pump driven by a d.c. energizable motor operable from the vehicle battery system. A fuel spray nozzle connected with the reservoir is directed into the boiler combustion chamber and a blower, driven by a d.c. energizable motor, is provided for producing a combustion-supporting air flow around the nozzle. Means, including an electrically controllable valve, are provided for selectively admitting fuel from the reservoir to the nozzle. The valve and the blower motor are energized when the temperature of the coolant in the boiler falls below a preselected level and an electric ignition means is selectively operated to ignite fuel sprayed from the nozzle. The circulating pump motor is then energized when the temperature of the coolant in the boiler exceeds a second preselected level higher than the first, thereby to provide heat to the vehicle engine from the boiler.

BRIEF DESCRIPTION OF THE DRAWINGS

Corresponding reference and characters indicate corresponding parts throughout the several views of the drawings.

DESCRIPTION OF THE PREFERRED EMBODIMENT

Figure 1:
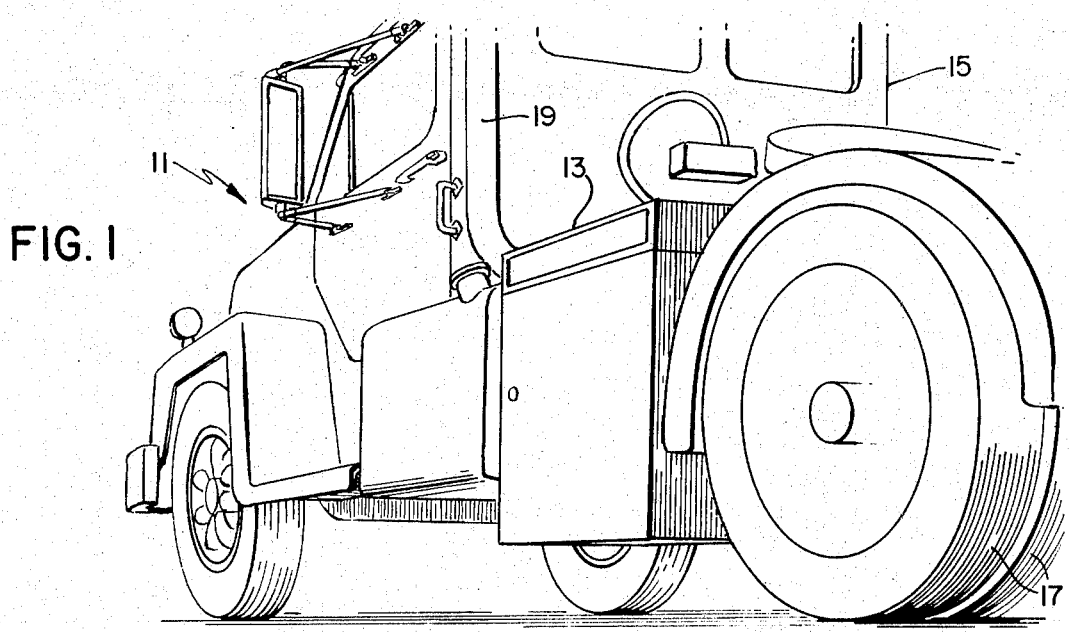
FIG. 1 is a perspective view indicating the manner in which a heater of the present invention may be mounted on a semi-trailer tractor.

In FIG. 1, which shows a semi-trailer tractor unit, designated generally as 11, a preferred mode of mounting the heater unit of the present invention is shown in which the heater is contained within a separate, lockable metal box 13 which is mounted exteriorly of the truck cab 15. A preferred location is just ahead of the driving wheels 17. If desired, a matching cabinet may be provided on the other side for the storage of tools, etc. An exhaust stack 19 extends from the heater unit to a point above the cab 15 so as to remove heater exhaust fumes from the area of the cab itself.

Figure 2:
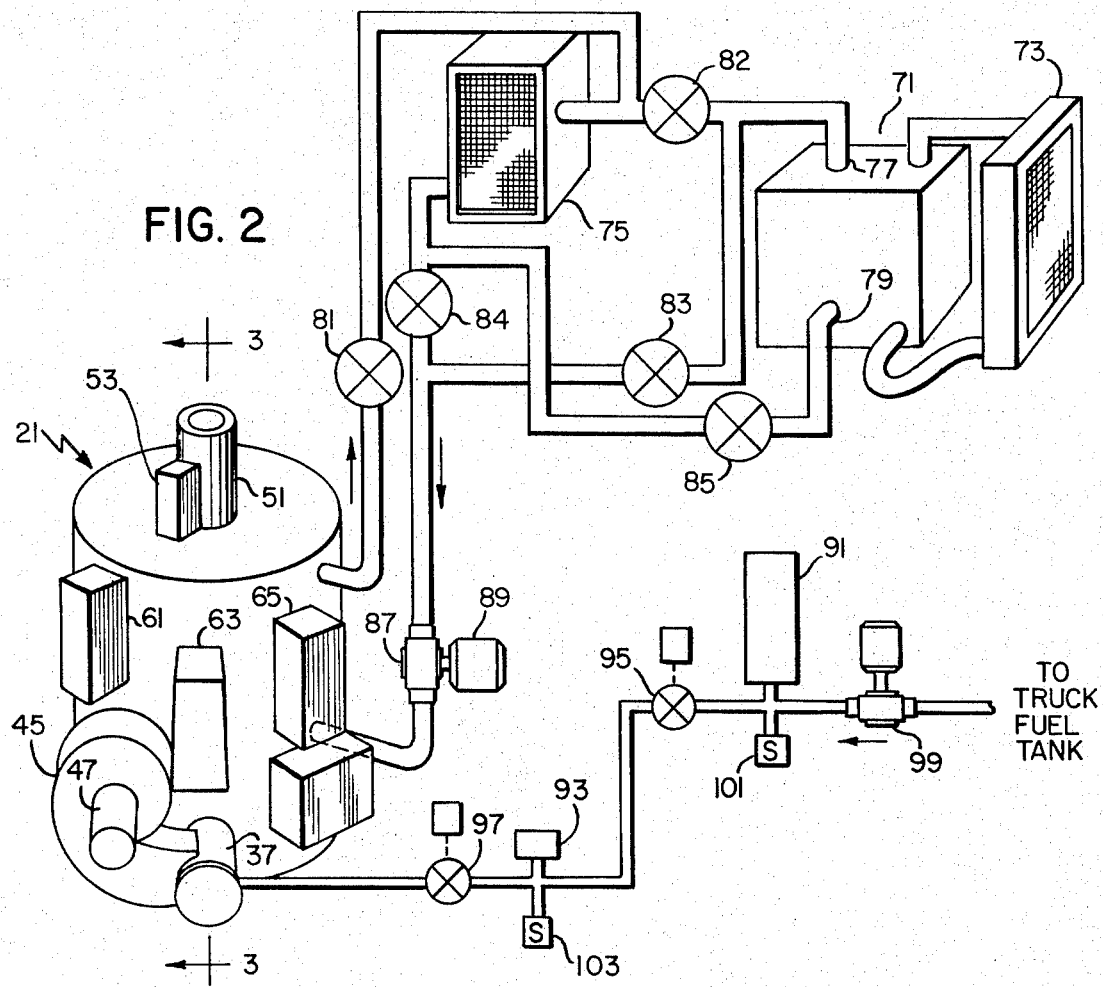
FIG. 2 is a somewhat schematic flow diagram showing the interconnection of the heater with the truck's coolant and fuel systems.
Figure 4:
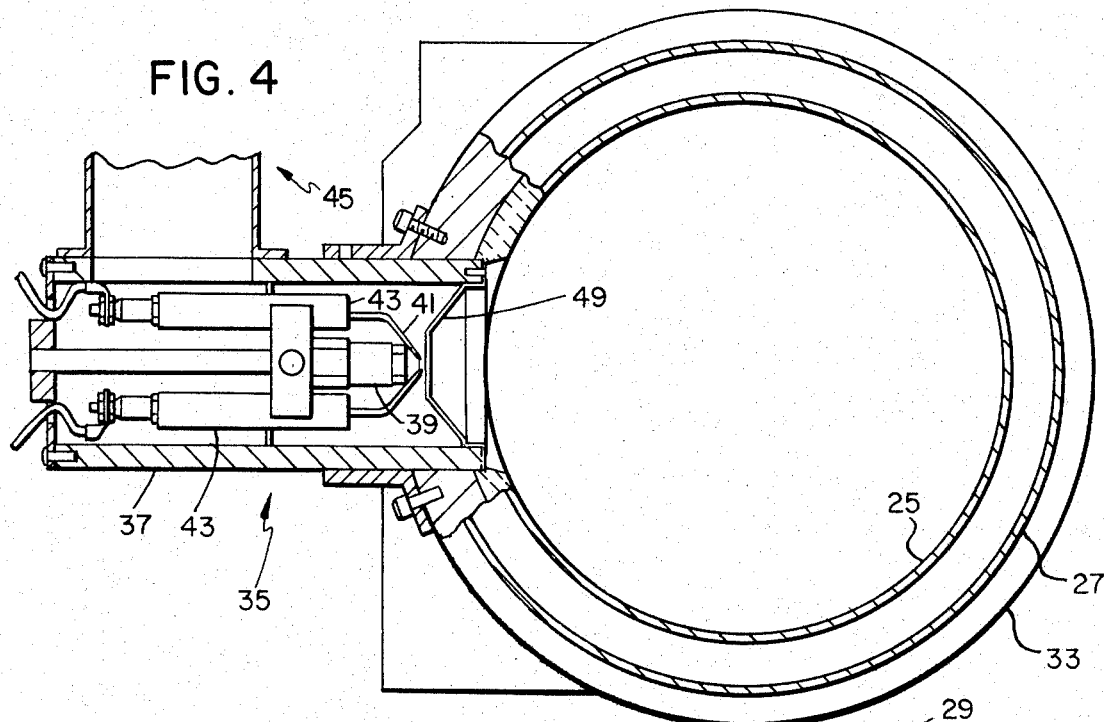
FIG. 4 is a sectional view taken on the lines 4—4 of FIG. 3.

In FIG. 2, the burner or boiler unit itself is indicated generally at 21. The construction of the boiler unit is shown in somewhat more greater detail in FIGS. 3 and 4. As shown in these latter drawings, the boiler is generally of the fire-pot type comprising a double-walled shell having an inner cylindrical wall 25 and an outer cylindrical wall 27 with the engine coolant liquid, e.g., water, to be heated being contained between the walls as indicated at 29. The base of the unit preferably comprises a steel inner liner 31 surrounded by a refractory ceramic liner 33 which protects the outer housing or cabinet 13 from the heat of combustion.

Mounted on one side of the base is a gun-type oil burner, designated generally as 35. Burner 35 comprises a tube 37 extending laterally from the boiler base and having mounted therein a fuel spray nozzle 39 and a pair of ignition electrodes 41 which extend through respective ceramic insulators 43. Mounted on one side of the tube 37 is a small centrifugal blower 45 powered by a 12-volt d.c. motor 47 adapted to be powered from the truck's battery electrical system. The entire blower unit may be of the type normally utilized in automotive passenger compartment heaters. The blower 45 is adapted to provide a flow of air past the nozzle 39 for supporting combustion of fuel oil sprayed from that nozzle. A conventional conical shield around the nozzle is provided as indicated at 49. Exhaust gases generated by combustion within the fire-pot are drawn off through a vent in the top of the boiler structure, as indicated at 51 in FIG. 2, which is connected to the exhaust stack 19 shown in FIG. 1. For use in conjunction with the burner safety control circuitry described hereinafter, an exhaust temperature thermostat 53 is mounted on the vent 51 for sensing the presence of combustion in the burner.

Figure 3:
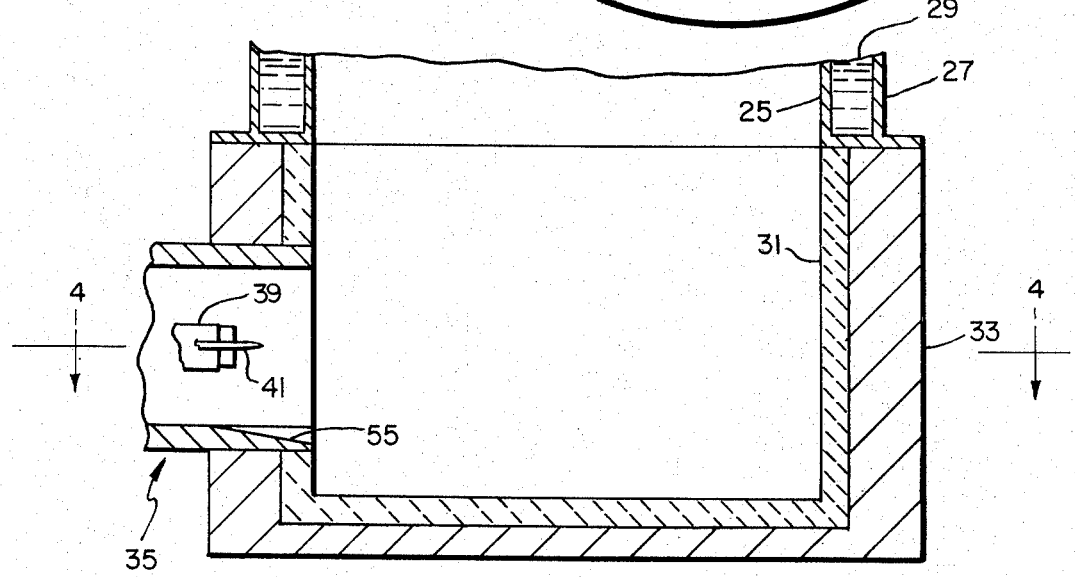
FIG. 3 is a sectional view of the heater unit itself, being taken on the lines 3—3 of FIG. 2.

As may be seen in FIG. 3, the tube 37 preferably includes an inclined groove 55 cut into the tube below the jet 39 so that any dripping of fuel from the nozzle will be led back into the combustion chamber, even if the burner unit is slightly inclined, e.g., if the truck were parked on uneven ground. An advantage of the gun type burner is that the vehicle does not have to be level for proper operation.

As indicated in FIG. 2, the boiler unit is provided with three water temperature-sensing thermostats 61, 63 and 65 which are in communication with the liquid in the boiler. The liquid in the boiler is also in communication with the truck coolant system. The truck engine block is indicated diagrammatically at 71 with the engine coolant radiator at 73. During operation, i.e., when the engine is running, heat is selectively provided to the tractor cab by means of a cab heater 75 which utilizes the warm engine coolant. The usual taps on the engine block through which this coolant is drawn off are indicated at 77 and 79. The conventional flow pattern is merely a loop from these taps through the heater and back again. However, the heater of the present invention is interconnected with the engine block 71 and the cab heater 75 through a network of conduits which include a plurality of valves 81-85 which permit either conventional or various auxiliary heating arrangements of the present invention to be assembled. One of the conduits to the heater or boiler 21 includes a circulating pump 87 powered by a 12-volt d.c. motor 89 which is energizable directly from the truck battery electrical system. While 12-volt motors have been described throughout as exemplary, it should be understood that the voltage in any particular installation will be selected to be consistent with the automotive system with which the apparatus is to be used.

The heater burner is provided with fuel oil drawn from the main truck engine tank. The fuel flow, however, is managed by means of a system which includes a pair of pressure accumulators 91 and 93, and a pair of solenoid valves 95 and 97 as well as an electric fuel pump 99. Associated with each accumulator 91 and 93 is a respective pressure switch 101 and 103 respectively. Pump 99 can charge accumulator 91, which is relatively large so as to act as a reservoir, while the accumulator 93 can be charged from the first accumulator when valve 95 is energized. Valve 97 controls the flow of fuel from the second accumulator 93 to the burner nozzle.

Figure 5:
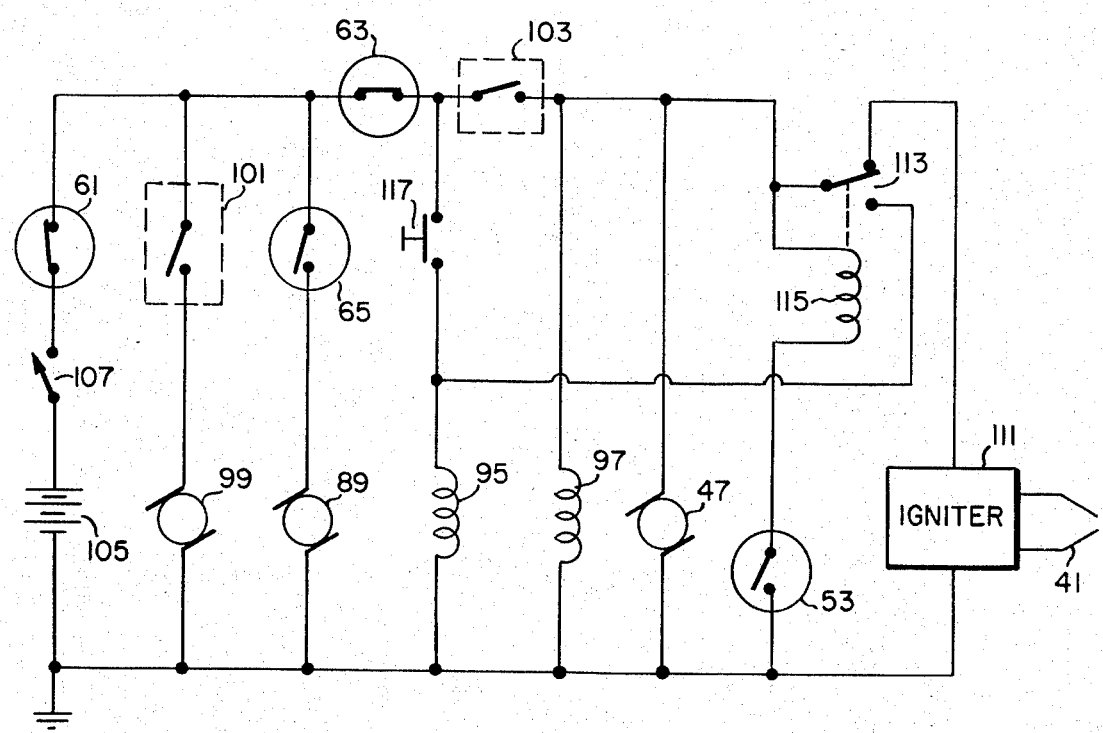
FIG. 5 is a schematic wiring diagram of the electrical control circuit for the heater.

In the circuit diagram of FIG. 5, the 12-volt truck battery is indicated at 105 while a main system ON/OFF switch is indicated at 107. Of the three water temperature thermostats 61, 63 and 65, the first, 61, is a high-limit switch which is normally closed but opens to de-energize the system if the water temperature exceeds a predetermined limit, e.g. 190°F. The second thermostat 63 is normally closed but opens on a temperature rise to approximately 180°F, this being the operating or demand control. The third thermostat 65 is normally open and closes at approximately 140°F to operate the circulating pump.

When the system is in use, its basic operation is to circulate the coolant liquid any time the coolant temperature is above a relatively low threshold. This function is provided by the thermostat 65 which energizes the circulating pump motor 89 anytime the cooling temperature is above the set level, e.g., 140°F. The burner is selectively operated to maintain the coolant liquid at a preselected temperature, above that at which circulation is initiated. Burner operation is principally controlled by the thermostat 63 which thus functions as a switch whose operation represents demand. This thermostat closes when the coolant temperature falls below the desired level, e.g. 180°F.

Assuming that the pressure switch 103 is closed, indicating that the accumulator 93 is full, the closing of the demand thermostat 63 energizes the solenoid valve 97 which admits fuel to the burner from the accumulator 93 and also energizes the blower motor 47 and the igniter 111. Igniter 111 may comprise a vibrator or transistor inverter for providing a high voltage sufficient to generate sparks between the electrodes 41. It may be noted that, at this point, only that fuel held in the small accumulator 93 is available to the burner. If ignition does not take place within the predetermined time permitted by this limited amount of fuel, the drop in pressure in accumulator 93 causes the switch 103 to open, thereby de-energizing the blower and the igniter.

As may be seen from FIG. 5, the circuit through which igniter 111 is energized includes one side of a set of double throw relay contacts 113. Contacts 113 are controlled by a relay winding 115 which is selectively energized through the combustion sensing thermostat 53. Assuming that ignition takes place normally, the hot exhaust gases cause this thermostatic switch 53 to close and thereby energize the relay winding 115. This action de-energizes the igniter 111 and energizes the solenoid valve 95. Thus, further fuel is supplied to the burner and the small accumulator 93 from the large accumulator 91 and, ultimately, from the truck fuel tank. During normal operation under the control of the demand thermostat 63, the large accumulator is periodically filled from the truck's fuel tank by the pump 99 which is energized by the closing of pressure switch 101 when the pressure in that first accumulator falls below the desired level. Thus, the pump 99 does not have to run continuously and battery power is conserved.

Initially, it was assumed that the accumulator 93 was full and that the switch 103 was thus closed. However, to permit this small accumulator to be initially filled at the start of the heating operation, the solenoid valve 95 may be directly energized by operating a pushbutton switch, indicated at 117.

When the coolant reaches the temperature threshold of the thermostat 65, the circulator motor 89 will be energized and the warmer coolant will be circulated through the cab heater 75 and the engine block in series, the heater getting the coolant first while it is at the higher temperature. Under quite cold climatic conditions, the forced circulation of the coolant, which takes heat away from the boiler, may cause it to remain below the temperature threshold established by the thermostat 63. In this case, the burner will continue to run indefinitely, being utilized to its full capacity. If the full capacity of the burner is not needed, its operation will be cycled under the control of the demand thermostat 63 to maintain the desired coolant temperature.

While the burner will be shut off by the opening of the thermostat 63, the circulating pump motor 89 can continue to run so long as hot water coolant, e.g., above 85°F., is available in the boiler. As the boiler cools down through the transfer of heat to the engine or the cab, the thermostat 63 will eventually re-close so that another cycle of operation will begin. From the foregoing it will be seen that the burner will thus be cycled to maintain the temperature of the coolant in the boiler at approximately the selected level and that the circulating pump will run essentially continuously to distribute the available heat to the truck cab and block.

Assuming that it is desired to heat both the cab and the engine, valves 82 and 84 are closed and valves 81, 83 and 85 are opened. If it is desired to heat only the cab, valves 82, 83 and 85 are closed while valves 81 and 84 are opened, thus bypassing the engine block but allowing the boiler to communicate with the cab heater 75. During operation on the road when the boiler is not being utilized, valves 81, 83 and 84 are closed while valves 82 and 85 are opened. In this mode the engine block and heater are interconnected in a simple loop in conventional manner.

Figure 6:
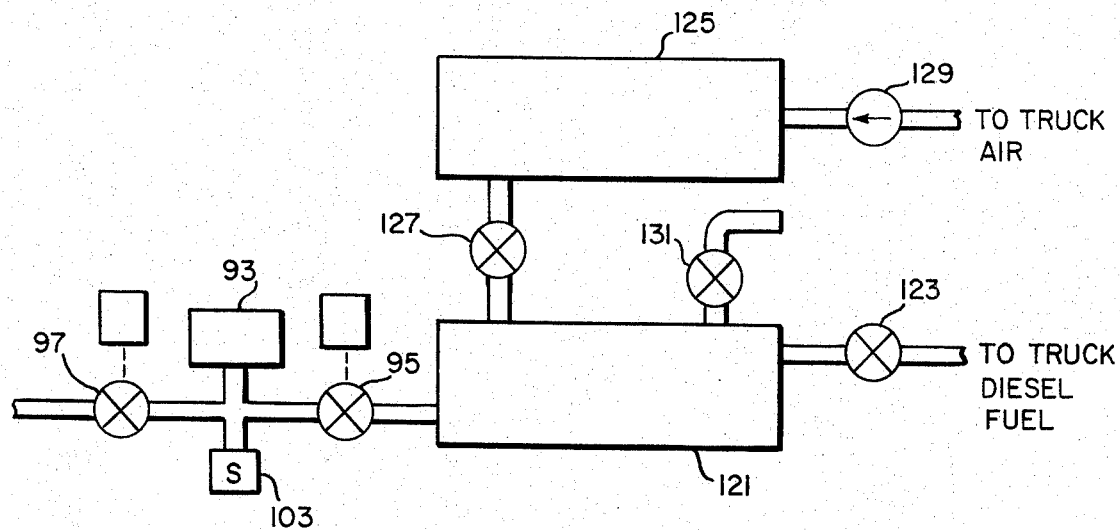
FIG. 6 is a diagram of an alternate fuel supply arrangement.

An alternate arrangement for providing fuel to the burner with even less consumption of electricity is illustrated in FIG. 6. This embodiment makes use of the usual truck air system to provide fuel under pressure. In FIG. 6, a relatively large fuel reservoir is provided, as indicated at 121, for holding sufficient fuel to operate the burner for the normally expected period of unattended operation. This reservoir is preferably located below the main fuel tank so that it can be filled by gravity from the main tank through a valve 123.

The fuel reservoir 121 can be selectively pressurized from an air reservoir 125 through a valve 127. The air reservoir 125 itself is kept charged from the truck's air system through a check valve 129. Check valve 129 assures that pressure will be maintained in the chamber 125 even though the truck's air system, with all its couplings and fittings, may leak down in pressure overnight. A vent valve 131 is provided for releasing pressure from the fuel reservoir 121 to permit its filling from the main truck tank when the air shutoff valve 127 is closed. Preferably, fuel from the reservoir 121 is provided through solenoid valve 95 to the small accumulator 93 as in the previous embodiment so as to permit the same burner safety mode of operation described hereinbefore.

In view of the foregoing, it may be seen that several objects of the present invention are achieved and other advantageous results have been attained.

As various changes could be made in the above construction and methods without departing from the scope of the invention, it should be understood that all matter contained in the above description or shown in the accompanying drawings shall be interpreted as illustrative and not in a limiting sense.

I claim:

1. In an automotive vehicle powered by a liquid-cooled diesel engine, having a tank for containing diesel fuel for said engine and a battery electrical system; a heat generating system for use when the diesel engine is stopped, said heat generating system comprising:

a fuel reservoir separate from the vehicle engine fuel tank;

means for charging said reservoir with diesel fuel from said vehicle engine tank and for pressurizing said reservoir;

a boiler including a combustion chamber;

means, including a circulating pump driven by a d.c. energizable motor operable from said battery system, for interconnecting said boiler with the vehicle engine coolant system;

a fuel spray nozzle directed into said combustion chamber;

a blower, powered by a d.c. energizable motor operable from said battery system, for providing a combustion-supporting air flow around said nozzle;

means, including an electrically controllable valve, for selectively admitting fuel from said reservoir to said nozzle;

means, powered from said battery system, for opening said valve and energizing said blower motor when the temperature of the coolant in said boiler falls below a first preselected level;

electric ignition means, powered from said battery system, for selectively igniting fuel sprayed from said nozzle; and means for energizing said circulating pump motor from said battery system when the temperature of the coolant in said boiler exceeds a second preselected level which is higher than said first preselected level thereby to provide heat for said vehicle engine.

2. A control system for a liquid fueled burner having a fuel spray nozzle, a blower for providing an air flow around said nozzle to support combustion of fuel sprayed therethrough, and an electrically energizable igniter for initiating burning of an air-fuel mixture at said nozzle, said control system comprising:
- a demand switch which is closed when heat is required from the burner;
- an accumulator for holding a small amount of fuel capable of sustaining combustion at said burner for a predetermined short period only;
- electric valve means for admitting fuel from said accumulator to said nozzle under control of said demand switch;
- means for sensing combustion in said burner;
- electrically operable means, controlled by said sensing means, for providing fuel to said accumulator under pressure when combustion is present in said chamber;
- means, responsive to said demand switch and said sensing means for energizing said igniter when fuel is initially admitted to said burner from said accumulator and combustion is not present; and
- a pressure switch responsive to the pressure in said accumulator, said blower, said igniter and said fuel providing means being interconnected with said pressure switch to be de-energized when the pressure in said accumulator falls below a predetermined value.

3. A control system as set forth in claim 2 further comprising a boiler heated by said burner and a circulating pump which is energized when liquid in the boiler is heated above a preselected temperature.

4. In an automotive vehicle powered by a liquid-cooled diesel engine and having a tank for containing diesel fuel for said engine and a battery electrical system; a heat generating system for use when the diesel engine is stopped, said heat generating system comprising:
- a fuel reservoir separate from the vehicle engine fuel tank;
- means for charging said reservoir with diesel fuel from said vehicle engine tank and for pressurizing said reservoir;
- a boiler including a combustion chamber;
- means, including a circulating pump driven by a d.c. energizable motor operable from said battery system, for interconnecting said boiler with the vehicle engine coolant system;
- a fuel spray nozzle directed into said combustion chamber;
- a blower, powered by a d.c. energizable motor operable from said battery system, for providing a combustion-supporting air flow around said nozzle;
- an accumulator for holding a small amount of fuel capable of sustaining combustion at said burner for a predetermined short time only;
- means, including an electrically operable valve, for selectively admitting fuel from said accumulator to said nozzle;
- electric ignition means, powered from said battery system, for selectively igniting fuel sprayed from said nozzle;
- means for opening said valve and energizing said blower motor and said ignition means when the temperature of the coolant in said boiler falls below a first preselected level;
- means for energizing said circulating pump motor from said battery system when the temperature of the coolant in said boiler exceeds a second preselected level which is higher than said first preselected level thereby to provide heat for said vehicle engine;
- means, including a second electrically controllable valve, for selectively admitting fuel from said reservoir to said accumulator;
- means for sensing combustion in said burner and for de-energizing said ignition means and opening said second valve when combustion is present; and
- a pressure switch responsive to the pressure in said accumulator, said blower, said ignition means and said second valve being interconnected with said pressure switch to be de-energized thereby, when the pressure in the accumulator falls below a predetermined value.

5. In a semi-trailer truck tractor having a liquid-cooled diesel engine, a tank for containing diesel fuel for said engine, a battery electrical system, and an air brake system, the tractor cab being heated by a heater which is interconnected with the engine coolant system; a heat generating system for use when the diesel engine is stopped, said heat generating system comprising:
- a fuel reservoir separate from the tractor engine fuel tank;
- an air reservoir separate from said air brake system
- means for charging said fuel reservoir with diesel fuel from said tractor engine tank;
- means for charging said air reservoir from said air brake system;
- means for pressurizing said fuel reservoir from said air reservoir;
- a boiler including a combustion chamber;
- means, including a circulating pump powered by a d.c. energizable motor operable from said battery system, for interconnecting said boiler with the engine coolant system and said heater;
- a fuel spray nozzle directed into said combustion chamber;
- a blower, powered by a d.c. energizable motor operable from said battery system, for providing a combustion-supporting air flow around said nozzle;
- an exhaust stack for venting said combustion chamber exteriorly of said tractor;
- means, including an electrically controllable valve, for selectively admitting fuel from said reservoir to said nozzle;
- means, powered from said battery system, for opening said valve and energizing said blower motor when the temperature of the coolant in said boiler falls below a first preselected level;
- electric spark ignition means, powered from said battery system, for igniting fuel sprayed from said nozzle;
- means for energizing said ignition means when said valve is initially opened and for de-energizing said ignition means when combustion exists in said chamber; and
- means for energizing said circulating pump motor from said battery system when the temperature of the coolant in said boiler exceeds a second preselected level which is higher than said first preselected level thereby to provide heat for the tractor cab and engine.

* * * * *